(12) United States Patent
Rogers (10) Patent No.: US 8,542,243 B2
(45) Date of Patent: Sep. 24, 2013

(54) HIGH-COMPRESSION TEXTURE MAPPING

(75) Inventor: Douglas H. Rogers, Gilroy, CA (US)

(73) Assignee: Douglas H. Rogers, Gilroy, CA (US)

( * ) Notice: Subject to any disclaimer, the term of this patent is extended or adjusted under 35 U.S.C. 154(b) by 463 days.

(21) Appl. No.: 12/950,019

(22) Filed: Nov. 19, 2010

(65) Prior Publication Data
US 2011/0115806 A1     May 19, 2011

Related U.S. Application Data

(60) Provisional application No. 61/262,648, filed on Nov. 19, 2009.

(51) Int. Cl.
*G09G 5/00*     (2006.01)
(52) U.S. Cl.
USPC .......... 345/582; 345/423; 345/552; 345/555; 382/232
(58) Field of Classification Search
None
See application file for complete search history.

(56) References Cited

U.S. PATENT DOCUMENTS

| | | | |
|---|---|---|---|
| 6,298,169 B1 * | 10/2001 | Guenter | 382/253 |
| 6,738,058 B1 * | 5/2004 | Gruber et al. | 345/419 |
| 7,714,873 B2 * | 5/2010 | Flavell et al. | 345/582 |
| 2005/0002584 A1 * | 1/2005 | Qian et al. | 382/253 |
| 2008/0055331 A1 * | 3/2008 | Iourcha et al. | 345/582 |

* cited by examiner

*Primary Examiner* — Antonio A Caschera
(74) *Attorney, Agent, or Firm* — Holland & Hart LLP (57) ABSTRACT

Embodiments provide texture compression with high compression ratios and low decompression times. Some embodiments partition a texture map into texel blocks. The number of blocks is reduced until a compression threshold is reached, and the resulting blocks are stored as a codebook. An index array is generated by associating each texel block with an index and associating each index with the block in the codebook identified as a closest match to the associated texel block. The codebook may then be compressed according to a technique compatible with a GPU. In certain embodiments, to render a scene, a CPU "inflates" the texture map by copying the appropriate codebook block to each indexed block location of the texture map, as defined by the index array. Because the codebook blocks are already compressed in a format compatible with the GPU, the inflated texture map is also compatible with the GPU without further processing.

20 Claims, 8 Drawing Sheets

HIGH-COMPRESSION TEXTURE MAPPING

CROSS-REFERENCES

This application claims priority from co-pending U.S. Provisional Patent Application No. 61/262,648, filed Nov. 19, 2009, entitled "HIGH-COMPRESSION TEXTURE MAPPING", which is hereby incorporated by reference, as if set forth in full in this document, for all purposes.

BACKGROUND

The present invention relates in general to computer graphics, and in particular to the use of compression in texture mapping functions.

Many computer generated scenes are created by modeling objects in the scene as a three-dimensional representation made of polygons defined by sets of vertices. Various types of texture maps may then be applied to the polygons to create a desired (e.g., realistic) look and feel for the scene. Application of the textures may include applying texture coordinates to polygon vertices, subdividing polygons, etc.

For example, a player approaches a brick wall in a video game. The brick wall may be modeled as a set of polygons (e.g., a rectangular prism), and may be rendered in one scene image substantially as a single flat face (e.g., as few as one polygon) visible from the context of the player. Multiple texture maps may then be applied to the face of the wall to make it look like brick. One texture map may include a brick image that is applied as a single image, as tiles, as patches, etc., for example, to provide color effects for the wall. Another texture map may include a normal map, or bump map, for example, to provide depth and lighting effects for the wall.

In graphics processing systems, the rendering method is often divided between a computer's general-purpose central processing unit (CPU) and a graphics processing unit (GPU). Typically, the CPU performs high-level operations, such as determining the position, motion, and collision of objects in a given scene, and generates a set of rendering commands and data defining the desired rendered scene. Rendering commands and data can define scene geometry by reference to groups of vertices, each having attributes, such as texture-map coordinates. The rendering commands and data may then be sent to the GPU for rendering the scene, for example, for viewing on a display.

Over time, suppliers and consumers have desired scene renderings with ever-increasing texture resolutions, thereby placing ever-increasing demands on graphics processing systems. Various types of compression are used with texture maps to allow the graphics processing systems to effectively render scenes having highly complex textures (e.g., large numbers of texture maps, high texture resolutions, high numbers of vertices, etc.). Many of these texture compression techniques, however, have drawbacks.

Figure 1A:
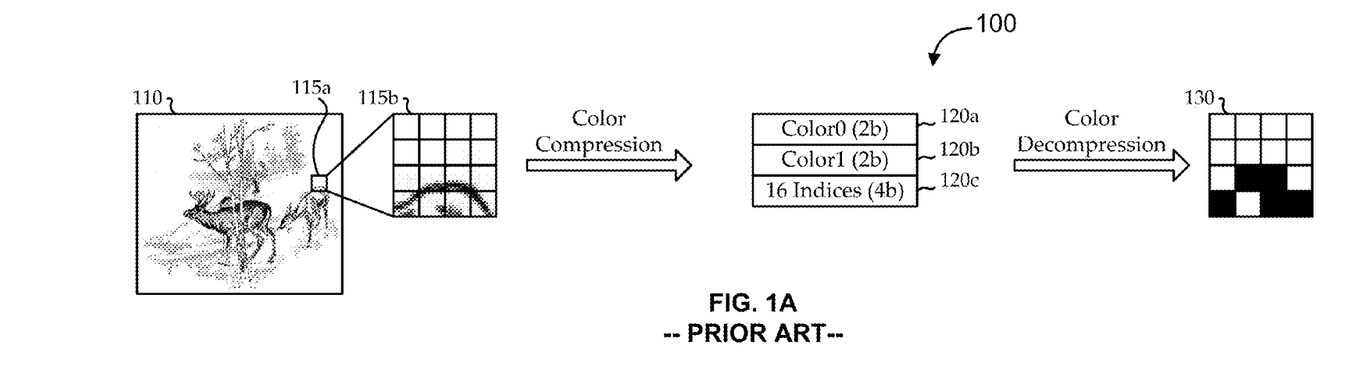
FIG. 1A illustrates a flow diagram of a prior art texture compression technique.

FIG. 1A illustrates a flow diagram 100 of a prior art texture compression technique. The technique shown in FIG. 1A is illustrative of techniques, like S3 Texture Compression (S3TC), or DXT compression. A texture map 110 is represented as a two-dimensional image. The texture map 110 is partitioned into blocks 115 (e.g., 4-by-4 texture pixel (texel) blocks). Block 115a illustrates a block location in the texture map 110, and block 115b illustrates a zoomed-in view of the same location in the texture map 110. Notably, as illustrated by block 115b, some texels within the block 115 are lighter, while other texels in the block 115 are darker.

Each block 115 is compressed according to the compression technique. As illustrated, the result may be a compressed version of the sixteen-texel (4-by-4) block 115 in eight bytes. For example, two colors may be selected to most closely represent the texels in the block 115. A compressed dataset 120 is generated for the block 115. The compressed dataset 120 includes a first two bytes 120a designating the first color (color0), a second two bytes 120b designating the second color (color1), and four bytes 120c designating sixteen color indices associated with the sixteen texels in the block 115.

The compressed dataset 120 may be sent from the CPU to the GPU when needed for rendering a scene. The GPU may then decompress each block 115 of the texture map 110 by applying the color designations to the texels in the block 115 as indicated by the color indices to generate a decompressed block 130. It is worth noting that the original sixteen texels are recreated by the GPU in a "lossy" manner. It is further worth noting that the technique illustrated in FIG. 1A uses a fixed compression ratio (e.g., DXT1 has a fixed compression ratio of 6-to-1). The fixed compression ratio may decrease the complexity of implementing the technique in hardware, and, indeed, many CPUs on the market are designed to implement DXT compression in hardware.

Figure 1B:
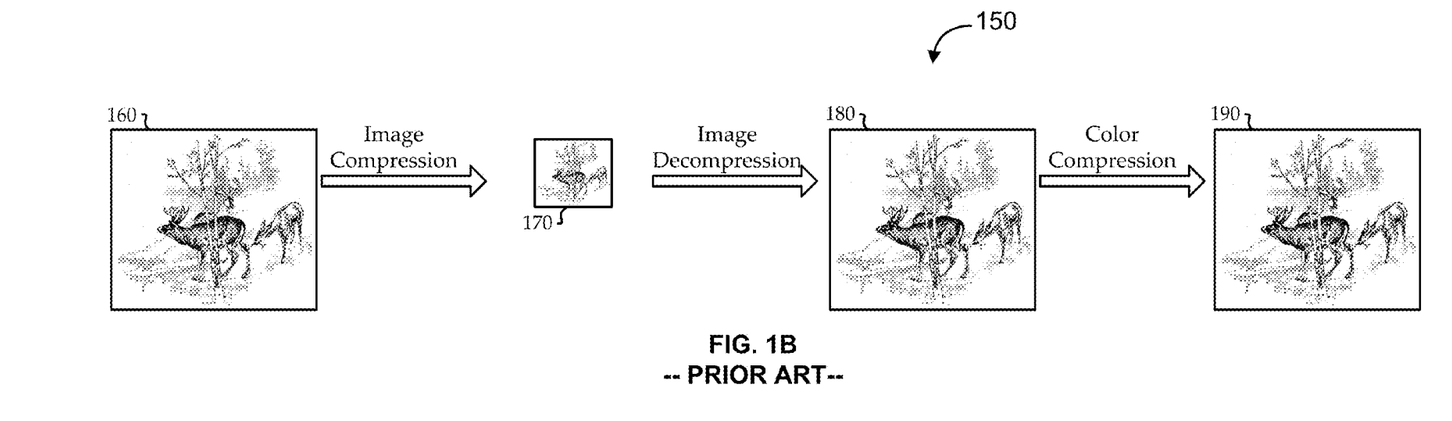
FIG. 1B illustrates a flow diagram of another prior art texture compression technique.

While DXT and other fixed-rate compression techniques may be compatible with many GPUs, they may not provide sufficient compression for effectively using high-resolution textures in certain applications. As such, other techniques may be used, for example, involving intermediate, variable-rate, high-compression of the texture map. FIG. 1B illustrates a flow diagram 150 of another prior art texture compression technique. The texture map 160 is compressed into a variable-rate, high-compression format, like a JPEG file 170. The compressed JPEG file 170 may be stored as part of the application (e.g., the video game). To use the compressed JPEG file 170, the CPU may have to convert the file to a format compatible with the GPU. Typically, the CPU may decompress the JPEG file 170 into an intermediate decompressed format, like an RGB(A) file 180. The RGB(A) file 180 may then be re-compressed into the compatible format, like a DXT file 190, for GPU rendering. It is worth noting that the technique illustrated in FIG. 1B may yield significantly higher compression ratios than those of the technique illustrated in FIG. 1A. However, the cost of the higher compression ratio includes the extra processing resources (e.g., processing time) used in decompressing and re-compressing the texture map data.

It may therefore be desirable to implement texture compression with high compression ratios and low decompression times.

BRIEF SUMMARY

Among other things, methods and systems are provided for implementing texture compression with high compression ratios and low decompression times. Embodiments partition a texture map into blocks of texels. The number of blocks is reduced (e.g., using vector quantization and/or other techniques) until a compression threshold is reached. The compression threshold may be defined according to a desired error rate, block quantity, compression rate, speed, and/or other factors. The blocks are stored as a codebook. An index array may then be generated by associating each block of the texture map with an index, and associating each index with an entry (block) in the codebook identified as a closest match. The codebook may then be compressed according to a technique compatible with a GPU (e.g., using DXT compression). To use the texture map in rendering a scene, the CPU may "inflate" the texture map by effectively copying a codebook block to each indexed block location of the texture map, as defined by the index array. Notably, because the codebook blocks are already compressed in a format compatible with the GPU, the resulting inflated texture map may be used directly by the GPU without further processing.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

This description provides exemplary embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted, or combined. Also, features and other aspects described with respect to certain embodiments may be combined in various other embodiments.

It should also be appreciated that the following systems, methods, and software may be a component of a larger system, wherein other procedures may take precedence over or otherwise modify their application. Also, a number of steps may be required before, after, or concurrently with the following embodiments.

In various embodiments, methods and systems implement texture compression with high compression ratios and low decompression times. Embodiments partition a texture map into blocks of texture pixels (texels). The number of blocks is reduced and stored as a codebook. An index array is generated by associating each block of the texture map with an index, and associating each index with a codebook block that closely matches the associated texture map block. The codebook is compressed to be compatible with a graphics processing unit (GPU). In some embodiments, the GPU, or a central processing unit (CPU), "inflates" the texture map by effectively copying a codebook block to each indexed block location of the texture map, as defined by the index array. The inflated texture map is compatible with the GPU, and may be used directly by the GPU for scene rendering.

Figure 2:
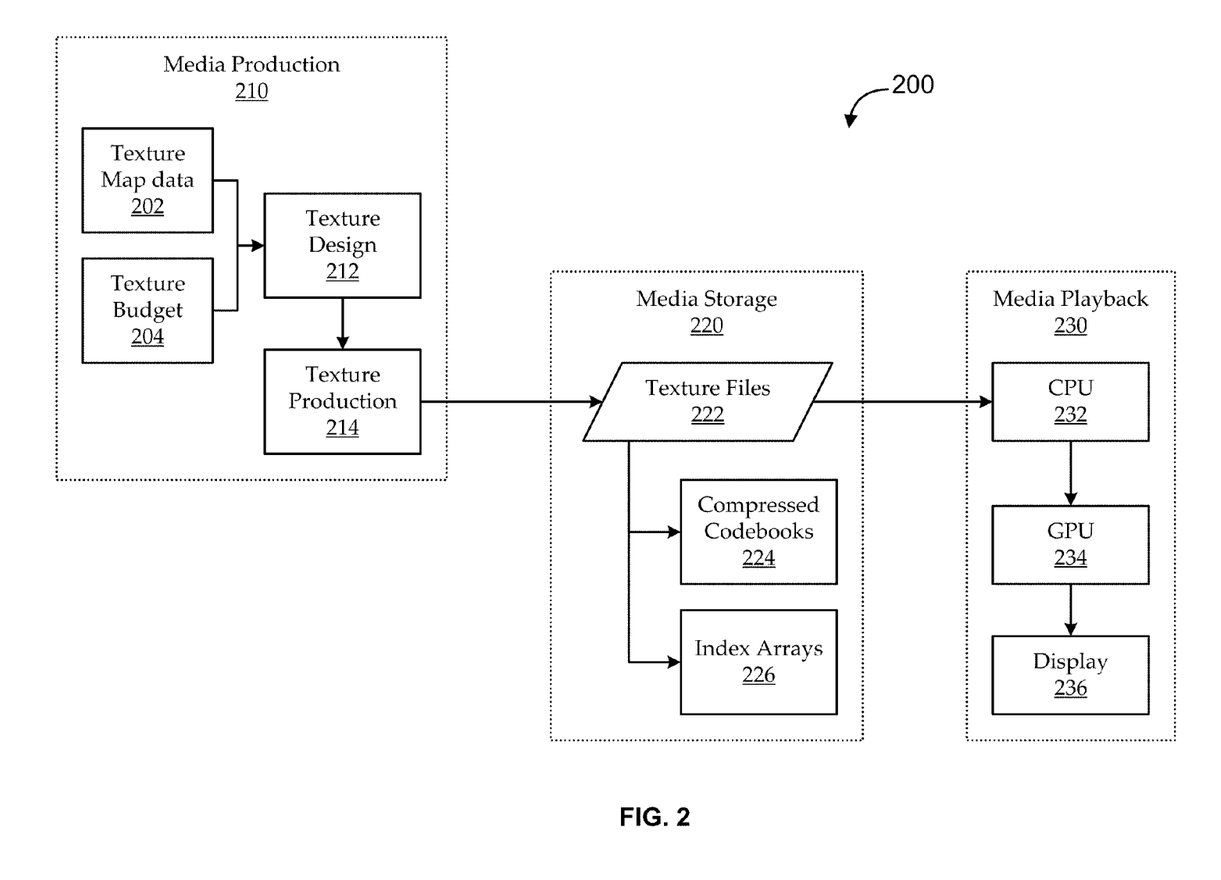
FIG. 2 shows a simplified block diagram of an illustrative media delivery environment for use with various embodiments.

Turning first to FIG. 2, a simplified block diagram of an illustrative media delivery environment 200 is shown for use with various embodiments. The media delivery environment 200 includes a media production portion 210, a media storage portion 220, and a media playback portion 230. The illustrated media delivery environment 200 is intended only to provide further clarity and context for the descriptions that follow and should not be construed as limiting the invention in any way. For example, it will be appreciated that tasks described as being performed in one portion of the media delivery environment 200 may be performed in other locations of the media delivery environment 200 or even external to the media delivery environment 200.

In an illustrative method for creating and using texture maps, the texture maps are first created by the media production portion 210 of the media delivery environment 200. A texture design group 212 may develop the texture map based on a number of types of inputs, including texture map data 202 and texture budgets 204. The texture map data 202 may include any type of texture map images or other information, such as texture images, bump (or normal) maps, tiling or patching data, etc. The texture budgets 204 may describe certain specifications, such as the maximum file size for a texture map, a desired compression rate, etc. The texture map data 202, texture budgets 204, and/or other types of information may be used by a texture production group 214 to generate texture files 222 for use in texture mapping. This production method will be described in more detail below.

The resultant texture files 222 are stored and/or delivered in the media storage portion 220 of the media delivery environment 200. For example, the texture files 222 may be stored on a server (e.g., for use in a network or software-as-a-service environment), stored at an end user's playback device, stored on a type of portable media (e.g., a disk), etc. According to embodiments of the invention, the texture files 222 include compressed codebooks 224 and index arrays 226, as described more fully below.

In the media playback portion 230 of the media delivery environment 200, the texture files 222 are used for playback of media that involves the textures, for example, to render the scene of a video game or other type of video media. In a typical media playback portion 230, graphics processing elements, including a CPU 232 and a GPU 234, are used to render scenes to a display 236 using the texture files 222. This rendering method will be described more fully below.

Figure 3:
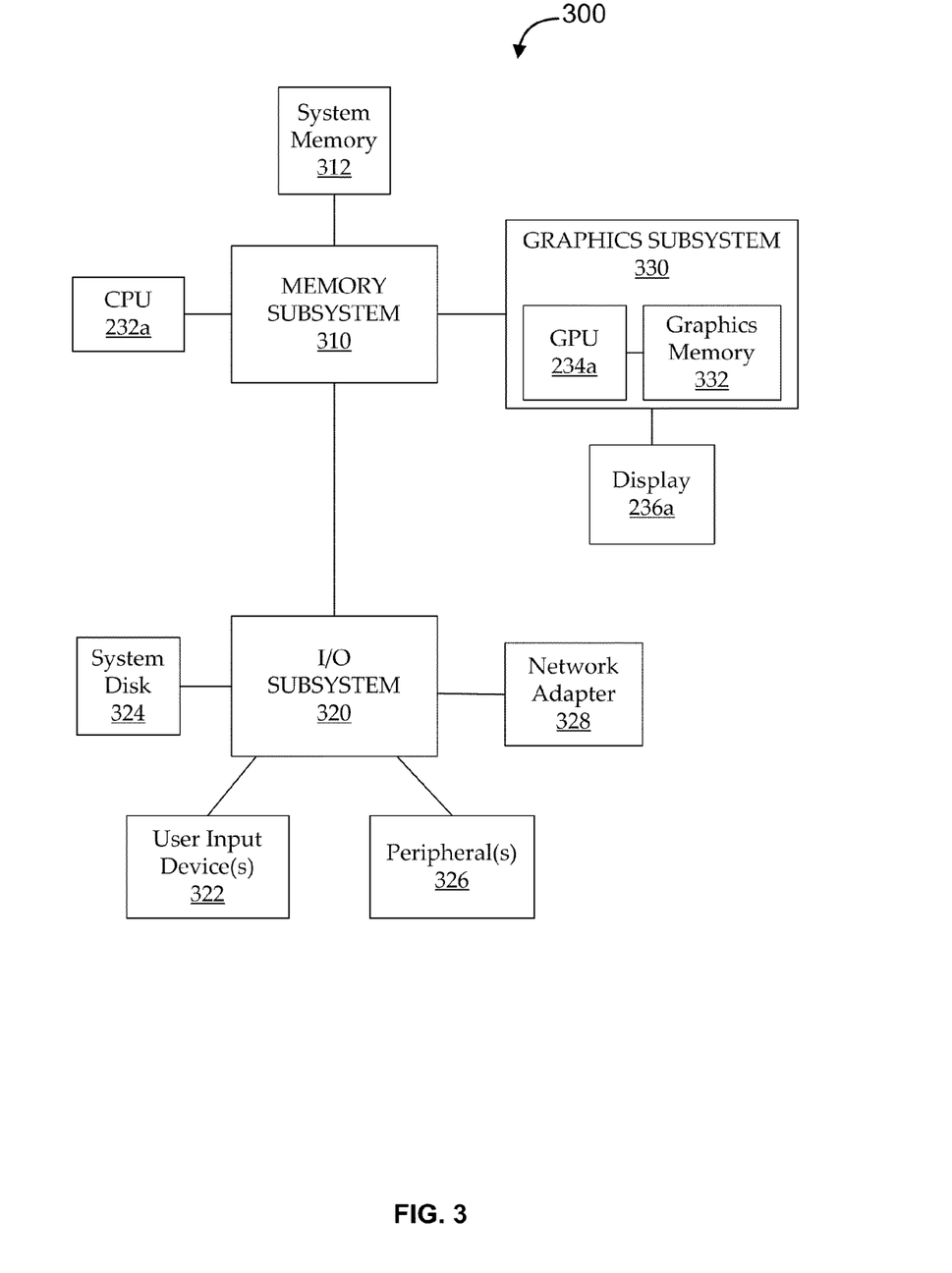
FIG. 3 shows a block diagram of one embodiment of a graphics processing system for use with various embodiments.

It will be appreciated that the media playback portion 230 may include any useful components for texture and graphics processing. FIG. 3 shows a block diagram of one embodiment of a graphics processing system 300, for use with various embodiments. The graphics processing system 300 includes a memory subsystem 310, an input/output (I/O) subsystem 320, and a graphics subsystem 330. A CPU 232a and a system memory 312 communicate (e.g., via a bus path) to the memory subsystem 310. The memory subsystem 310 may include a memory bridge and/or other memory components, and may be in communication with the I/O subsystem 320.

The I/O subsystem 320 receives user input from one or more user input devices 322 (e.g., keyboard, mouse) and forwards the input to CPU 232a via the memory subsystem 310 (e.g., through an I/O bridge, a bus, and memory bridge). A system disk 324 is also connected to I/O subsystem 320. Other devices may also be connected to the I/O subsystem 320 (e.g., through a switch or other interface or component), such as a network adapter 328 and one or more peripherals or add-in cards 326. Other components (not explicitly shown), including USB or other port connections, CD drives, DVD drives, and the like, may also be connected to I/O subsystem 320. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as known in the art.

Visual output is provided on display device 236a (e.g., a conventional, a pixel based CRT or LCD monitor) operating under control of the graphics subsystem 330, which may be in communication with the memory subsystem 310 via a bus or other communication path (e.g., a PCI Express (PCI-E) or Accelerated Graphics Port (AGP) link). Graphics subsystem 330 includes a GPU 234a and a graphics memory 332, which may be implemented, e.g., using one or more integrated circuit devices such as programmable processors, application specific integrated circuits (ASICs), and memory devices. GPU 234a may be configured to perform various tasks related to generating pixel data from graphics data supplied by CPU 232a and/or system memory 312 via memory subsystem 310, interacting with graphics memory 332 to store and update pixel data, and the like. For example, GPU 234a may generate pixel data from 2-D or 3-D scene data provided by various programs executing on CPU 232a, like texture map information. GPU 234a may also store pixel data received via memory subsystem 310 to graphics memory 332 with or without further processing. GPU 234a also includes a scanout module configured to deliver pixel data from graphics memory 332 to display device 236a.

CPU 232a operates as the master processor of graphics processing system 300, controlling and coordinating operations of other system components. In particular, CPU 232a issues commands that control the operation of GPU 234a. In some embodiments, CPU 232a writes a stream of commands for GPU 234a to a command buffer, which may be in system memory 312, graphics memory 332, or another storage location accessible to both CPU 232a and GPU 234a. GPU 234a reads the command stream from the command buffer and executes commands asynchronously with operation of CPU 232a. The commands may include conventional rendering commands for generating images as well as general-purpose computation commands that enable applications executing on CPU 232a to leverage the computational power of GPU 234a for data processing that may be unrelated to image generation.

Various components of graphics processing system 300 may receive or otherwise produce geometry data which includes, for example, objects defined by a number of vertices.

In one embodiment, texture files (e.g., texture files 222 of FIG. 2) are stored on a disk that is accessible to the graphics processing system 300 via the I/O subsystem 320. CPU 232a executes one or more programs to inflate one or more highly compressed texture maps from the texture files for a scene. CPU 232a also receives scene data (e.g., virtual world coordinates, three-dimensional model information, etc.), from which it may identify vertices for the scene and appropriate vertex data, including texture coordinates and/or other information. As noted above, many computer graphics applications have highly detailed models, which may have significant computational costs, so the CPU 232a may create or otherwise identify vertex data for only a subset of vertices needed to render the scene. The vertex data, and/or other relevant scene rendering data, is passed through the rendering pipeline of the GPU 234a for use in scene rendering and output to the display device 236a.

It is worth noting that any combination of the vertex data and/or other types of data (e.g., control data) may be received via the network adapter 328, or otherwise, from an external computing device local or remote to the graphics processing system 300. Also, any combination of the relevant data may be retrieved from memory local or remote to the graphics processing system 300. This data together may be forwarded (e.g., in the form of a compressed set of data) to the rendering pipeline of GPU 234a. In one embodiment, the identification of the set of vertices and creation of the control data may be executed, in whole or in part, by GPU 234a.

Various embodiments of the graphics processing system 300 implement the rendering pipeline of the GPU 234a in different ways. For example, the rendering pipeline may be configured to receive vertex data for a reference subset of a group of vertices. It may also receive control data with parameters for reconstructing at least some of the other subsets of the group using the vertex data for the reference subset. Embodiments of the rendering pipeline are implemented using an architecture in which any applicable vertex shader programs, geometry shader programs, and pixel shader programs may be executed concurrently using the same parallel-processing hardware.

It will be appreciated that the system shown herein is illustrative and that variations and modifications are possible. The bus topology, including the number and arrangement of bridges or subsystems, may be modified as desired. For instance, in some embodiments, system memory 312 is connected directly to CPU 232a, rather than through memory subsystem 310. In other alternative topologies, graphics subsystem 330 is connected to I/O subsystem 320, rather than to memory subsystem 310. In still other embodiments, I/O subsystem 320 and memory subsystem 310 might be integrated into a single chip (e.g., or a portion of each, such as a memory bridge and an I/O bridge, may be integrated onto a single chip). Further, particular components shown herein are optional; for instance, any number of add-in cards or peripheral devices 326 might be supported.

The connection of GPU 234a to the rest of the graphics processing system 300 may also be varied. In some embodiments, graphics subsystem 330 is implemented as an add-in card that can be inserted into an expansion slot of graphics processing system 300. In other embodiments, GPU 234a is integrated on a single chip with a bus bridge, such as a memory bridge or I/O bridge. In still other embodiments, some or all elements of GPU 234a are integrated into CPU 232a.

A GPU 234a may be provided with any amount of local graphics memory 332, including no local memory, and may use local memory and system memory 312 in any combination. For instance, in a unified memory architecture (UMA) embodiment, no dedicated graphics memory 332 device is provided, and the GPU 234a uses system memory 312 exclusively or almost exclusively. In UMA embodiments, the GPU 234a may be integrated into a bus bridge chip or provided as a discrete chip with a high-speed bus (e.g., PCI-E) connecting the GPU 234a to the bridge chip and system memory 312.

It is also to be understood that any number of GPUs 234a may be included in a system, e.g., by including multiple GPUs 234a on a single graphics card or by connecting multiple graphics cards to a bus. Multiple GPUs 234a may be operated in parallel to generate images for the same display device 236a or for different display devices 236a. In addition, GPUs 234a embodying aspects of various embodiments of the invention may be incorporated into a variety of devices and systems, including general purpose computer systems, video game consoles and other special purpose computer systems, DVD players, handheld devices such as mobile phones or personal digital assistants, and so on.

Embodiments of the graphics processing system 300 may be used to perform any number of graphics processing functions. For example, as discussed with reference to FIG. 2, the graphics processing system 300 may be part of a media playback portion 230 of a media delivery environment 200 in which, among other things, texture files 222 are generated and used. Methods for generating and using the texture files 222 are described in more detail in FIGS. 4-8.

Figure 4:
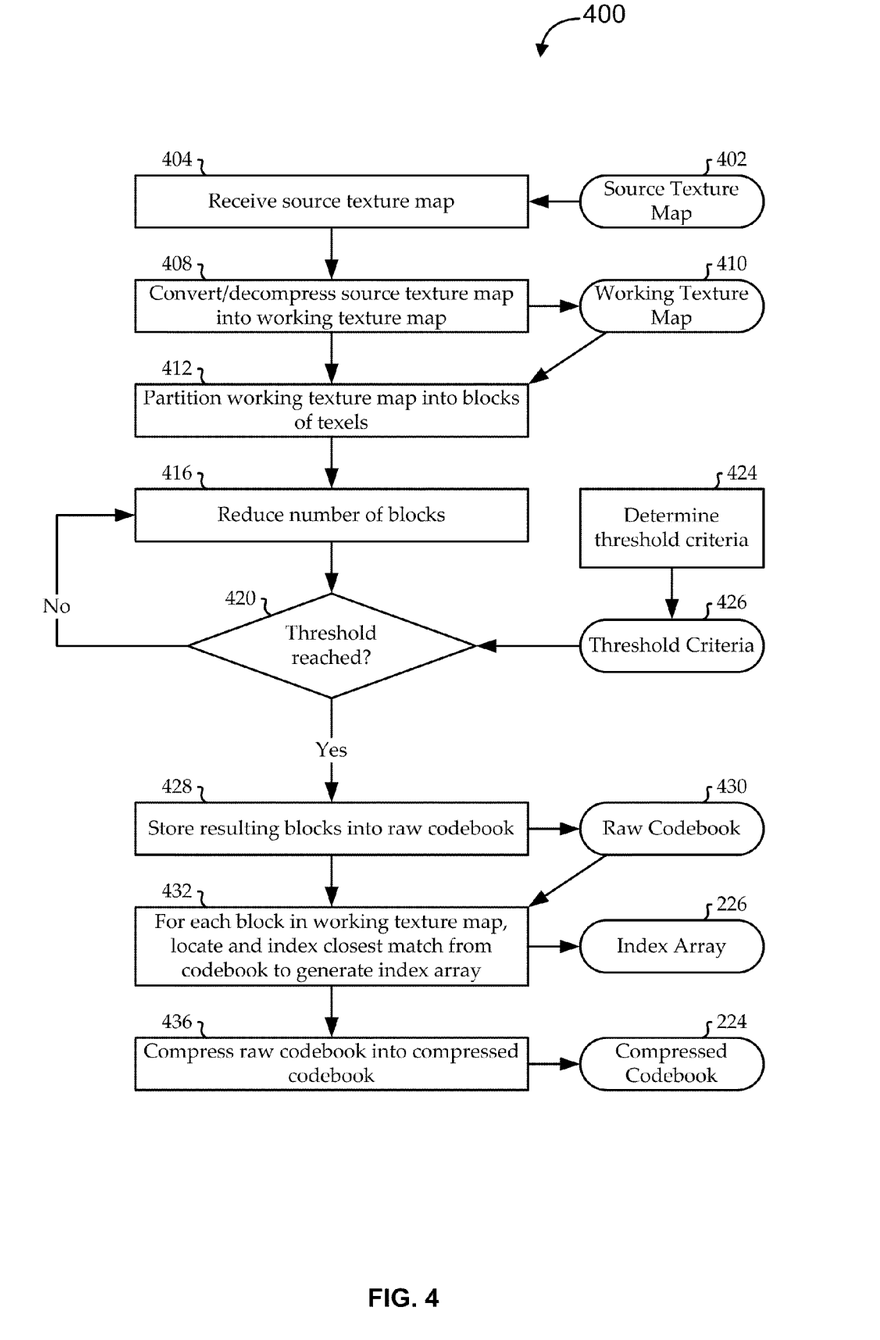
FIG. 4 is a flowchart illustrating a method for generating highly compressed texture files for use in graphics rendering, according to various embodiments.

FIG. 4 is a flowchart illustrating a method 400 for generating highly compressed texture files for use in graphics rendering, according to various embodiments. The method may, for example, be performed in whole or in part by the media production portion 210 of the media delivery environment 200 (e.g., by the texture production group 214). The method 400 begins at block 404 by receiving a source texture map file 402. The source texture map file 402 may be formatted according to a number of different file types, some of which are compressed. For example, the source texture map file 402 may be formatted as a compressed JPEG file, a compressed DXT file, a set of MIP maps, uncompressed data, etc. Embodiments of the method 400 convert and/or decompress the source texture map file 402 in block 408 to generate a working texture map 410. For example, a compressed JPEG image may be converted to uncompressed RGB(A) format for use in other steps of the method 400.

In block 412, the working texture map 410 is partitioned into texel blocks. In some embodiments, 4-by-4 blocks of texels are used (i.e., 16-texel blocks). For example, if the working texture map 410 is a 512-by-512-byte image, the working texture map 410 may be partitioned into approximately sixteen-thousand 4-by-4 texel blocks. According to various types of criteria, it will be appreciated that certain texel blocks may be identified as similar to other texel blocks. For example, multiple blocks may be similar in average color.

These similarities may be exploited in block 416 to reduce the number of texel blocks. For example, if a block is identified as being similar to a previous block, it may be deleted. Various techniques may be used for reducing the number of blocks, including nearest neighbor, or vector quantization, techniques. Blocks continue to be reduced (e.g., iteratively) until a determination is made in block 420 that a threshold has been reached.

In some embodiments, at block 424, threshold criteria 426 for the threshold used in block 420 are determined. In some embodiments, these threshold criteria 426 are determined at least in part by texture designers (e.g., the texture design group 212 of the media production portion 210 of the media delivery environment 200 of FIG. 2). In other embodiments, the threshold criteria 426 are based on system capabilities (e.g., the bandwidth of the rendering pipeline of the GPU, the amount of available graphics memory, available disk space for storage of texture files, rendering speed requirements, etc.). By way of example, the threshold criteria 426 may be based on certain types of error rate (e.g., root-mean-square (RMS) error or signal-to-noise ratio (SNR) of the reduced set of blocks as compared to the original set of blocks from the working texture map 410), a desired maximum total number of blocks (e.g., a codebook size, as discussed more below), a desired compression ratio (e.g., 10-to-1, 100-to-1, etc.), etc. In certain embodiments, the threshold criteria 426 are selected and/or designed to balance speed and quality considerations. For example, compressing to generate higher quality texture maps may place increased burdens and costs on the scene rendering.

When the threshold is reached (as determined in block 420), at block 428, the resulting blocks may be stored in a raw codebook 430. For example, the raw codebook 430 may be a one-dimensional array of texel blocks representing the reduced set of texel blocks from the partitioned working texture map 410 blocks. An index array 226 may then be generated at block 432 by assigning codebook blocks to working texture map 410 blocks. In one example, an index is created for each block of the working texture map 410. Each block of the working texture map 410 is compared to the blocks of the raw codebook 430 to determine a closest match. The index in the index array 226 that corresponds to the block of the working texture map 410 is then associated with (e.g., points to) the closest-matching block of the raw codebook 430.

In block 436, the raw codebook 430 is compressed into a compressed codebook 224. As discussed above, components of a graphics processing system (e.g., the GPU) may be compatible with certain formats of texture data. For example, many GPUs are capable of direct hardware decoding of DXT files. Embodiments of the method 400 compress the raw codebook 430 into the compressed codebook 224 at block 436 according to a format compatible with the GPU intended to be used to render scenes. For example, the media production portion 210 of a media delivery environment 200 may produce texture files 222 for use in particular types of media playback portions 230 (e.g., a particular type of video game console, a graphics card standard, etc.).

Figure 5:
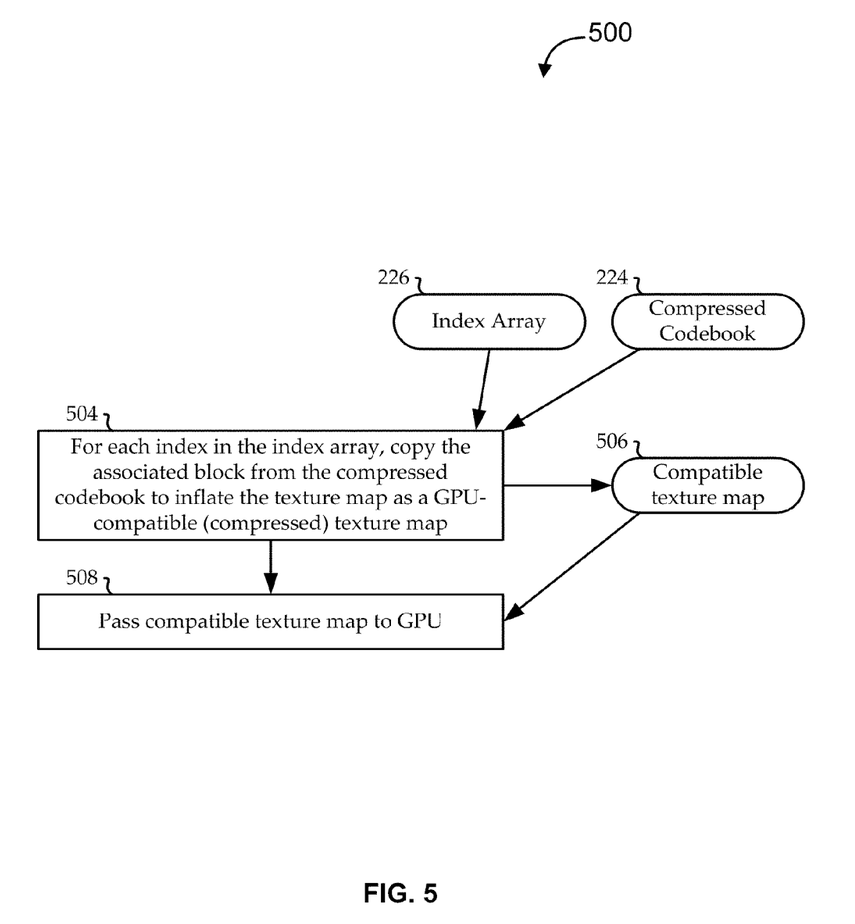
FIG. 5 is a flowchart illustrating a method for using highly compressed texture files, such as those generated according to the method of FIG. 4, according to various embodiments.

The production of the texture files may be complete at this point, or the method may continue in various ways. For example, as discussed above with reference to FIG. 2, the compressed codebook 224 and index array 226 may be output as texture files 222. Further, as discussed above, the texture files 222 may be used for graphics processing, including scene rendering. FIG. 5 is a flowchart illustrating a method 500 for using highly compressed texture files, such as those generated according to the method 400 of FIG. 4, according to various embodiments. The method may, for example, be performed in whole or in part by the media playback portion 230 of the media delivery environment 200 of FIG. 2 (e.g., by the CPU 232 and/or the GPU 234).

The method 500 begins at block 504 by "inflating" the compressed texture map to generate a compatible texture map 506. Embodiments of the compressed texture map include a compressed codebook 224 and an index array 226. For example, the compressed codebook 224 and the index array 226 may be created by the method 400 of FIG. 4. For each index in the index array 226, the associated block from the compressed codebook 224 is copied to the index location to inflate the texture map in block 504. The compatible texture map 506 may then be passed in block 508 to the GPU for scene rendering. For example, in some embodiments, the inflation is performed by the CPU and the resulting compatible texture map 506 is passed from the CPU to the GPU. In other embodiments, where the GPU performs the inflation, the resulting compatible texture map 506 may be passed from one portion of the GPU to another portion of the GPU, or not at all.

Various features of the inflation in block 504 will be appreciated. One feature is that the inflation may occur at almost the same speed that it takes to load the compressed codebook 224, as the inflation effectively involves copying the codebook blocks to the appropriate index locations to form the compatible texture map 506. Another feature is that the compatible texture map 506 may be compatible with the GPU rendering pipeline as it is inflated. In one embodiment, the GPU is designed to perform DXT hardware decoding. The compressed codebook 224 is made up of DXT-compressed blocks. When inflated, the compatible texture map 506 will effectively include an array of DXT-compressed blocks that can be sent directly to (or used directly by) the GPU for hardware decoding.

Figure 6:
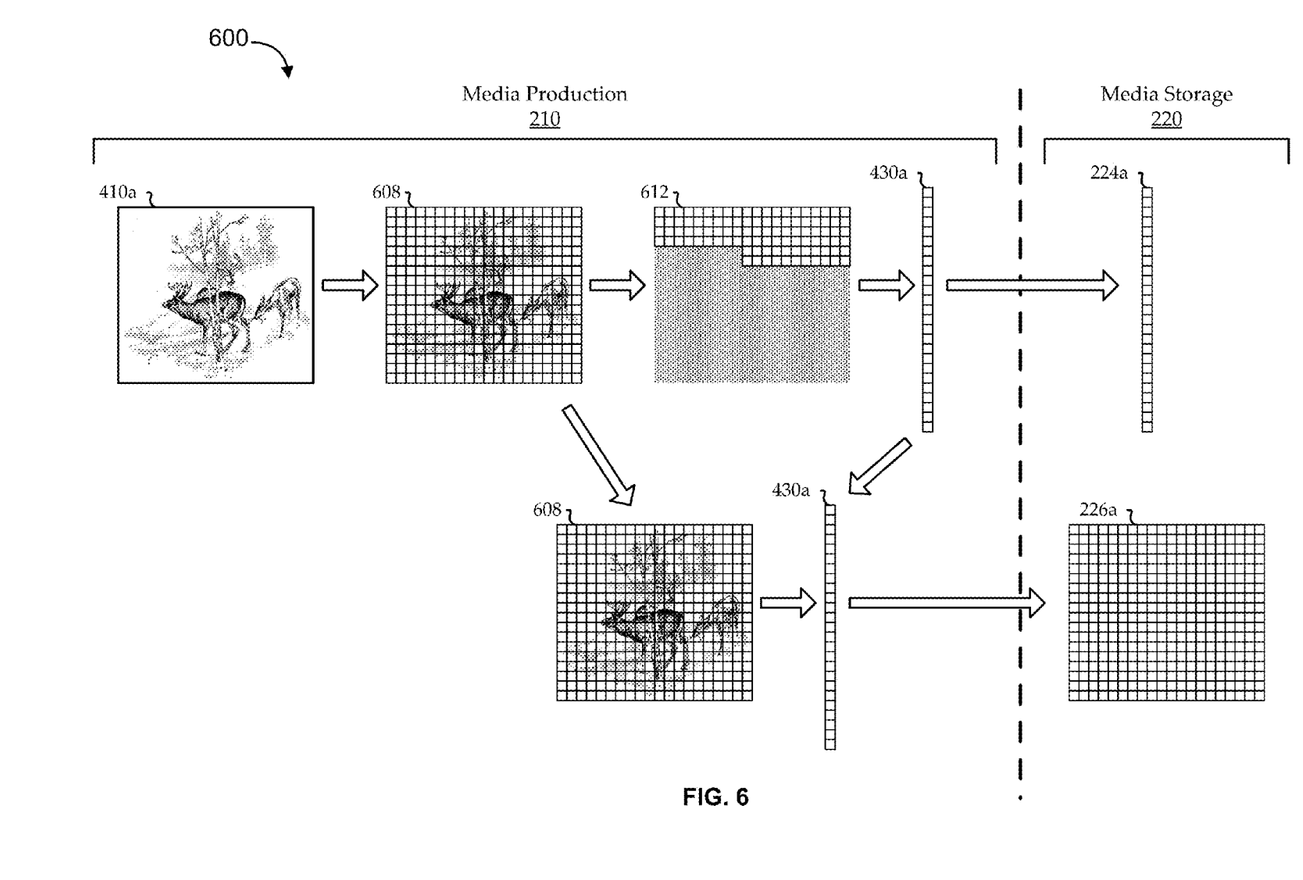
FIG. 6 shows a simplified graphical representation of a method for texture file generation, according to an embodiment of the method of FIG. 4.
Figure 7:
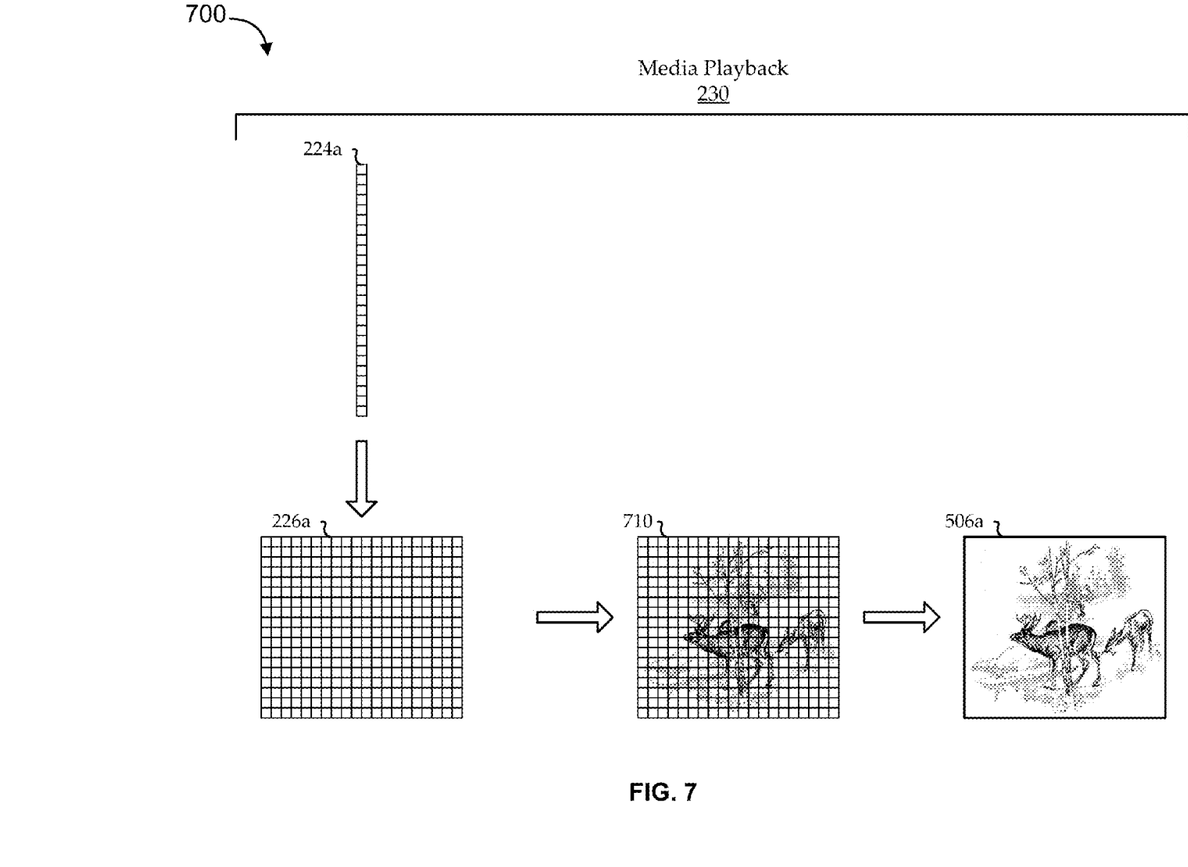
FIG. 7 shows a simplified graphical representation of a method for texture file usage, according to an embodiment of the method of FIG. 5.

For added clarity, an illustrative use case of the methods of FIGS. 4 and 5 is shown in FIGS. 6 and 7, respectively. FIG. 6 shows a simplified graphical representation of a method 600 for texture file generation, according to an embodiment of the method of FIG. 4. The method 600 is shown as having a media production portion 210 and a media storage portion 220 (e.g., like the corresponding portions of the media delivery environment of FIG. 2).

In the media production portion 210, a working texture map 410a is received. The working texture map 410a is partitioned into a set of texel blocks 608 (e.g., as in block 412 of FIG. 4). The number of blocks is then reduced to a reduced block set 612 (e.g., as in block 416 of FIG. 4) and stored as a raw codebook 430a (e.g., as in block 428 of FIG. 4). The raw codebook 430a is compressed to a compressed codebook 224a (e.g., as in block 436 of FIG. 4). The partitioned set of texel blocks 608 is compared against the raw codebook 430a to find closest matches, which are then indexed and stored as an index array 226a (e.g., as in block 432 of FIG. 4). The resulting compressed codebook 224a and index array 226a may then be stored (e.g., on storage media) in the media storage portion 220.

FIG. 7 shows a simplified graphical representation of a method 700 for texture file usage, according to an embodiment of the method of FIG. 5. The method 700 is shown as having a media playback portion 230 (e.g., like the corresponding portion of the media delivery environment of FIG. 2). As illustrated, a compressed codebook 224a and index array 226a (e.g., those resulting from and stored by the method 600 of FIG. 6) are received. Blocks of the compressed codebook 224a are copied to appropriate index locations defined by the index array 226a to generate an inflated array of compressed blocks 710 (e.g., as in block 504 of FIG. 5). It will be appreciated that the array of compressed blocks 710 will be representative of the partitioned set of texel blocks 608 shown in FIG. 6. Notably, the quality of the representation may depend on a number of factors, including the threshold criteria 426 determined in block 424 of the method 400 of FIG. 4. The array of compressed blocks 710 may then be used (e.g., as is) as a compatible texture map 506a by the GPU for scene rendering (e.g., including hardware decoding).

Figure 8:
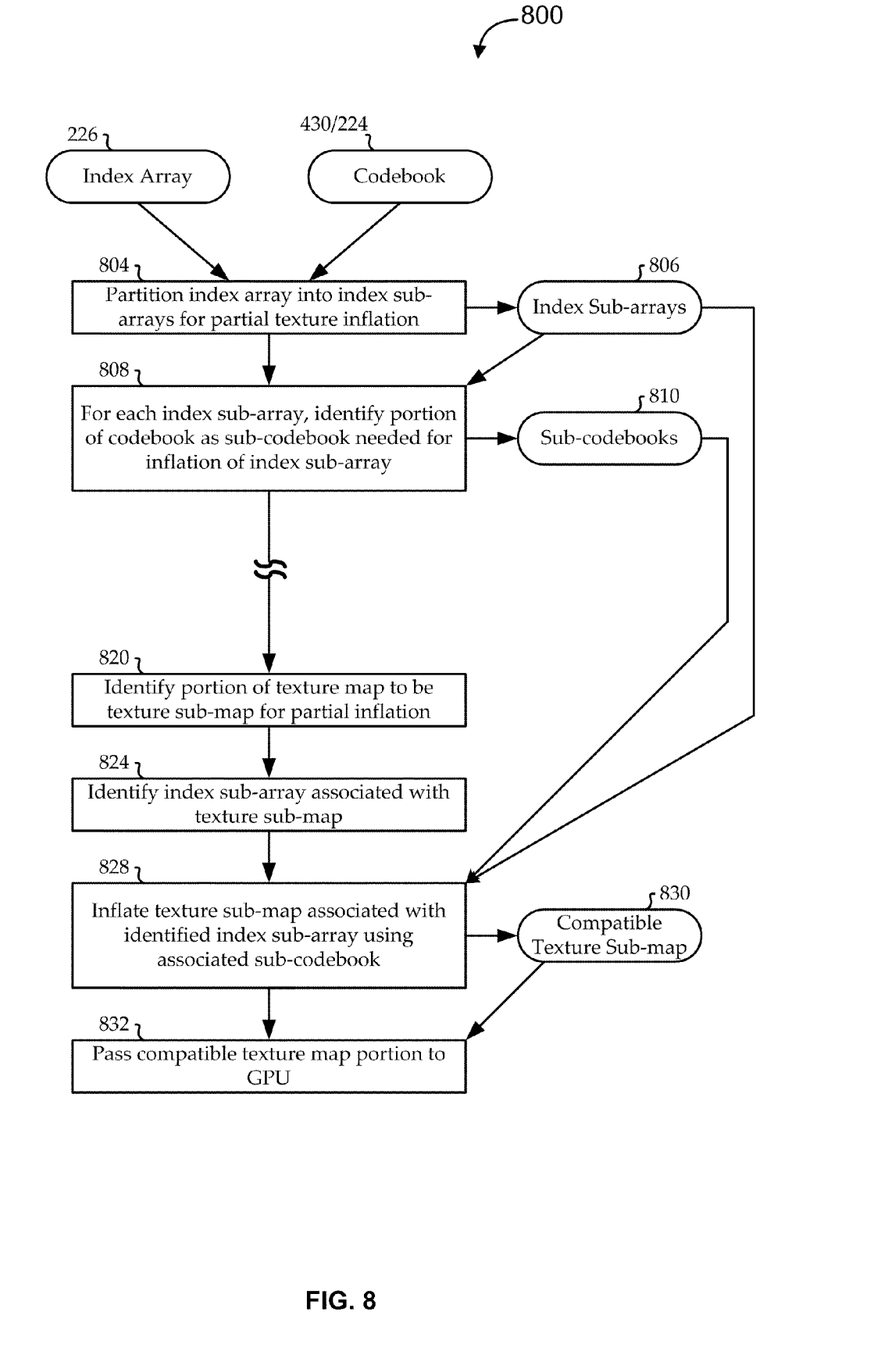
FIG. 8 is a flowchart illustrating a method for generating and using partial texture maps in highly compressed texture files, according to various embodiments.

It is worth noting that, in some embodiments, it is desirable not to use the entire texture map. For example, a texture map includes a bump map for a complex surface, but only a small portion of the surface is visible in a scene being rendered. It may be desirable to method only the information needed to render the visible portion of the surface (e.g., or at least as little superfluous information as possible). FIG. 8 is a flowchart illustrating a method 800 for generating and using partial texture maps in highly compressed texture files, according to various embodiments. Portions of the method may, for example, be performed in whole or in part by the media production portion 210 or the media playback portion 230 of the media delivery environment 200 of FIG. 2.

The method 800 begins at block 804 by partitioning an index array 226 into index sub-arrays 806 for use in partial texture inflation. In some embodiments, the index array 226 is the index array 226 generated by the method 400 of FIG. 4. The partitioning in block 804 may be determined in different ways. One type of partition may be based on simply subdividing the index array 226 into a set number of equal-sized index sub-arrays 806 (e.g., quadrants). Another type of partition may include evaluating regions of the index array 226 that are more likely to be visible on a scene at a particular time, or at the same time, and creating particular index sub-arrays 806 to, exploit that evaluation. For example, a sculpture is visible in a video game. Typically, because of the location or orientation of the sculpture, a player in the video game environment will predictably see only certain subsets of the polygonal faces that define the sculpture, but the texture map is created to apply to all the polygonal faces. The index sub-arrays 806 may be partitioned to cover only those subsets that are likely to be rendered according to a given scene perspective.

At block 808, a portion of a codebook is identified as a sub-codebook 810 for each index sub-array 806 as the subset of blocks of the codebook needed for inflation of the corresponding index sub-array 806. Depending on where in the method (e.g., where in the method 400 of FIG. 4) the sub-codebooks 810 are generated, block 808 may use either a raw codebook 430 or a compressed codebook 224. For example, the sub-codebooks 810 may be generated at block 808 prior to codebook compression (e.g., in block 436 of FIG. 4).

When a scene is rendered, and only a portion of the texture map is needed, the method 800 may continue at block 820. At block 820, the portion of the texture map needed for rendering the scene is identified as a texture sub-map. It is worth noting that the texture sub-map may, in fact, encompass more of the texture map than only what will be visible in the scene. For example, depending on characteristics of the index sub-arrays 806 or other factors, larger amounts of texture data may be needed to effectively render the scene, even where that extra data will not be visible in the final rendering.

At block 824, index sub-arrays 806 are identified according to the texture sub-map identified in block 820. At block 828, the index sub-arrays 806 and sub-codebooks 810 generated in blocks 804 and 808, respectively, are used to inflate the texture sub-map to generate a compatible texture sub-map 830. In some embodiments, the inflation in block 828 is substantially the same as the inflation described with reference to block 504 of FIG. 5). The compatible texture sub-map 830 may then be sent to the GPU for scene rendering (e.g., as in block 508 of FIG. 5).

The technique described with reference to FIG. 8 allows a texture map to be broken into smaller texture sub-maps for more efficient graphics processing. It will be appreciated that sub-map functionality can be used in various ways. For example, a number of smaller texture map tiles can be processed as texture sub-maps according to the method 800 to create a large texture map for application in scene rendering. As described above, each of the texture map tiles (as sub-maps) can then be inflated or otherwise processed with only their corresponding sub-codebooks, as needed in the scene.

It should be noted that the methods, systems, and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted, or combined. Also, features described with respect to certain embodiments may be combined in various other embodiments. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. Well-known circuits, processes, algorithms, structures, and techniques have been shown without unnecessary detail in order to avoid obscuring the embodiments.

Also, it is noted that the embodiments may be described as a method which is depicted as a flowchart or a block diagram. Although these may describe the operations as a sequential method, many of the operations can be performed in parallel or concurrently. In addition, the order of the operations may be re-arranged. A method is terminated when its operations are completed, but could have additional steps not included in the figure.

Moreover, as disclosed herein, the term "memory" may represent one or more devices for storing data, including read only memory (ROM), random access memory (RAM), magnetic RAM, core memory, magnetic disk storage mediums, optical storage mediums, flash memory devices, or other machine readable mediums for storing information. The term "machine-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method of generating a texture map for use with a graphics processing unit (GPU), the method comprising:
    partitioning, utilizing one or more processing units, a raw texture map file into raw texel blocks;
    reducing, utilizing one or more processing units, a number of raw texel blocks until a predefined compression metric is satisfied to generate a set of reduced texel blocks;
    saving, utilizing one or more processing units, the set of reduced texel blocks;
    generating, utilizing one or more processing units, an index array comprising a set of indices, each index designating a location of a respective raw texel block and a respective one of the set of reduced texel blocks in the codebook identified as being a closet match to the respective raw texel block; and
    generating, utilizing one or more processing units, a compressed codebook by compressing the codebook into a format compatible with the GPU, such that the compressed codebook comprises a compressed texel block associated with each reduced texel block.

2. The method of claim 1, further comprising:
    generating, utilizing one or more processing units, an inflated texture map that is compatible with the GPU by, for each index in the index array, copying the compressed texel block associated with the respective reduced texel from the compressed codebook to a location in the index array associated with the location of the respective raw texel block.

3. The method of claim 1, further comprising:
    receiving, utilizing one or more processing units, a source texture map file; and
    decompressing, utilizing one or more processing units, the source texture map file to generate the raw texture map file prior to the partitioning step.

4. The method of claim 1, wherein the format compatible with the GPU is a DXT format.

5. The method of claim 1, wherein the predefined compression metric is defined according to:
    an error rate relating to artifacts of reducing the number of raw texel blocks;
    a size of the codebook;
    a compression ratio between the size of the codebook and a size of the raw texture map file; and
    an amount of time expended in reducing the number of raw texel blocks.

6. The method of claim 1, wherein the predefined compression metric is defined according to an error rate relating to artifacts of reducing the number of raw texel blocks.

7. The method of claim 1, wherein the predefined compression metric is defined according to a size of the codebook.

8. The method of claim 1, wherein the predefined compression metric is defined according to a compression ratio between the size of the codebook and a size of the raw texture map file.

9. The method of claim 1, wherein the predefined compression metric is defined according to an amount of time expended in reducing the number of raw texel blocks.

10. A processing unit for generating a texture map for use with a graphics processing unit (GPU), the processing unit configured to:
    partition a raw texture map file into raw texel blocks;
    reduce a number of raw texel blocks until a predefined compression metric is satisfied to generate a set of reduced texel blocks;
    save the set of reduced texel blocks to a codebook;
    generate an index array comprising a set of indices, each index designating a location of a respective raw texel block and a respective one of the set of reduced texel blocks in the codebook identified as being a closest match to the respective raw texel block; and
    generate a compressed codebook by compressing the codebook into a format compatible the GPU, such that the compressed codebook comprises a compressed texel block associated with each reduced texel block.

11. The processing unit of claim 10, further configured to:
Generate an inflated texture map that is compatible with the GPU by, for each index in the index array, copying the compressed texel block associated with the respective reduced texel block from the compressed codebook to a location in the index array associated with the location of the respective raw texel block.

12. The processing unit of claim 10, further configured to:
receive a source texture map file; and
decompress the source texture map file to generate the raw texture map file prior to the partitioning step.

13. The processing unit of claim 10, wherein the format compatible with the GPU is DXT format.

14. The processing unit of claim 10, wherein the predefined compression metric is defined according to:
 an error rate relating to artifacts of reducing the number of raw texel blocks;
 a size of the codebook;
 a compression ratio between the size of the codebook and a size of the raw texture map file; and
 an amount of time expended in reducing the number of raw texel blocks.

15. The processing unit of claim 10, wherein the predefined compression metric is defined according to an error rate relating to artifacts of reducing the number of raw texel blocks.

16. The processing unit of claim 10, wherein the predefined compression metric is defined according to a size of the codebook.

17. The processing unit of claim 10, wherein the predefined compression metric is defined according to a compression ratio between the size of the codebook and a size of the raw texture map file.

18. The processing unit of claim 10, wherein the predefined compression metric is defined according to an amount of time expended in reducing the number of raw texel blocks.

19. A texture map compression system, comprising:
 a means for codebook generation, configured to:
  partition a raw texture map file into raw texel blocks;
  reduce a number of raw texel blocks until a predefined compression metric is satisfied to generate a set of reduced texel blocks; and
  save the set of reduced texel blocks to a codebook;
 a means for index generation, communicatively coupled with the means for codebook generation, and configured to generate an index array comprising a set of indices, each index designating a location of a respective raw texel block and a respective one of the set of reduced texel blocks in the codebook identified as being a closest match to the respective raw texel block; and
 a means for codebook compression, communicatively coupled with the means for codebook generation, and configured to generate a compressed codebook by compressing the codebook into a format compatible with a graphics processing unit, such that the compressed codebook comprises a compressed texel block associated with each reduced texel block.

20. A graphics processing system, comprising:
 a central processing unit (CPU) configured to:
  receive an index array and a compressed codebook, the compressed codebook generated by compressing a raw codebook into a format compatible with a graphics processing unit (GPU), such that the compressed codebook comprises a set of compressed texel blocks, each compressed texel block being associated with a block of the raw codebook and with at least one location of a raw texel block of a raw texture map identified by an index of the index array as closely matching the block of the raw codebook associated with a set of reduced texel blocks; and
  generate an inflated texture map that is compatible with the GPU by, for each index of the index array, copying the compressed texel block associated with the respective reduced texel block from the compressed codebook to the at least one location of the raw texel block of the raw texture map identified by the index.

\* \* \* \* \*